US012438715B2

(12) United States Patent
Rodriguez Bravo et al.

(10) Patent No.: US 12,438,715 B2
(45) Date of Patent: Oct. 7, 2025

(54) PREVENTING ACCESS OF REMOVED USERS TO MESSAGES SHARED IN A GROUP CHAT

(71) Applicant: Kyndryl, Inc., New York, NY (US)

(72) Inventors: Cesar Augusto Rodriguez Bravo, Alajuela (CR); David Alonso Campos Batista, Aurora (CR)

(73) Assignee: Kyndryl, Inc., New York, NY (US)

( * ) Notice: Subject to any disclaimer, the term of this patent is extended or adjusted under 35 U.S.C. 154(b) by 230 days.

(21) Appl. No.: 18/357,196

(22) Filed: Jul. 24, 2023

(65) Prior Publication Data
US 2025/0038973 A1   Jan. 30, 2025

(51) Int. Cl.
*H04L 9/08* (2006.01)
*G06F 21/62* (2013.01)
*H04L 9/40* (2022.01)

(52) U.S. Cl.
CPC ........ *H04L 9/0891* (2013.01); *G06F 21/6218* (2013.01); *H04L 63/101* (2013.01); *G06F 2221/2141* (2013.01)

(58) Field of Classification Search
CPC . H04L 9/0891; H04L 63/101; G06F 21/6218; G06F 2221/2141
See application file for complete search history.

(56) References Cited

U.S. PATENT DOCUMENTS

| | | | |
|---|---|---|---|
| 9,043,406 B2 | 5/2015 | Beadle et al. | |
| 9,413,700 B1 | 8/2016 | Jerrard-Dunne et al. | |
| 9,654,288 B1 * | 5/2017 | Howell | H04L 9/0822 |
| 10,684,746 B2 | 6/2020 | Chen et al. | |
| 10,897,362 B2 | 1/2021 | Yan | |
| 11,019,001 B1 | 5/2021 | Wu et al. | |
| 2009/0177974 A1 | 7/2009 | Cox et al. | |
| 2014/0351586 A1 | 11/2014 | Hook et al. | |
| 2016/0241399 A1 * | 8/2016 | Huang | H04L 63/0421 |
| 2018/0324155 A1 | 11/2018 | Leavy et al. | |
| 2019/0087432 A1 * | 3/2019 | Sion | G06F 21/6218 |
| 2020/0084185 A1 * | 3/2020 | Okano | G06F 16/00 |

(Continued)

FOREIGN PATENT DOCUMENTS

| | | |
|---|---|---|
| CN | 109981663 A | 7/2019 |
| KR | 101684919 B1 | 12/2016 |
| KR | 101861678 B1 | 5/2018 |

*Primary Examiner* — Yonas A Bayou
(74) *Attorney, Agent, or Firm* — CANTOR COLBURN LLP; Erik Swanson

(57) ABSTRACT

Embodiments relate to preventing access of removed users to messages shared in a group chat with an end-to-end encryption. An aspect includes, responsive to creation of a group having members for communicating using encryption keys, receiving a request to remove a given member of the members from the group, the given member being associated with a computer system, at least one message of the group being accessible to the given member. An aspect includes identifying the encryption keys associated with the given member and causing a deletion on the computer system of the encryption keys associated with the given member in response to the request. An aspect includes confirming the deletion of the encryption keys on the computer system associated with the given member. The deletion of the encryption keys on the computer system prevents access of the computer system to at least one message of the group.

17 Claims, 12 Drawing Sheets

(56) References Cited

U.S. PATENT DOCUMENTS

| | | | |
|---|---|---|---|
| 2020/0374114 A1* | 11/2020 | Okano | H04L 9/0819 |
| 2021/0359843 A1* | 11/2021 | Li | H04L 63/065 |
| 2022/0038416 A1 | 2/2022 | Allen et al. | |
| 2022/0286276 A1* | 9/2022 | Li | H04L 63/08 |
| 2022/0337417 A1* | 10/2022 | Sanders | H04L 67/34 |
| 2023/0216666 A1* | 7/2023 | Harwood | G06F 11/3006 |
| | | | 713/171 |
| 2024/0323013 A1* | 9/2024 | Dillon | H04L 9/0891 |

* cited by examiner

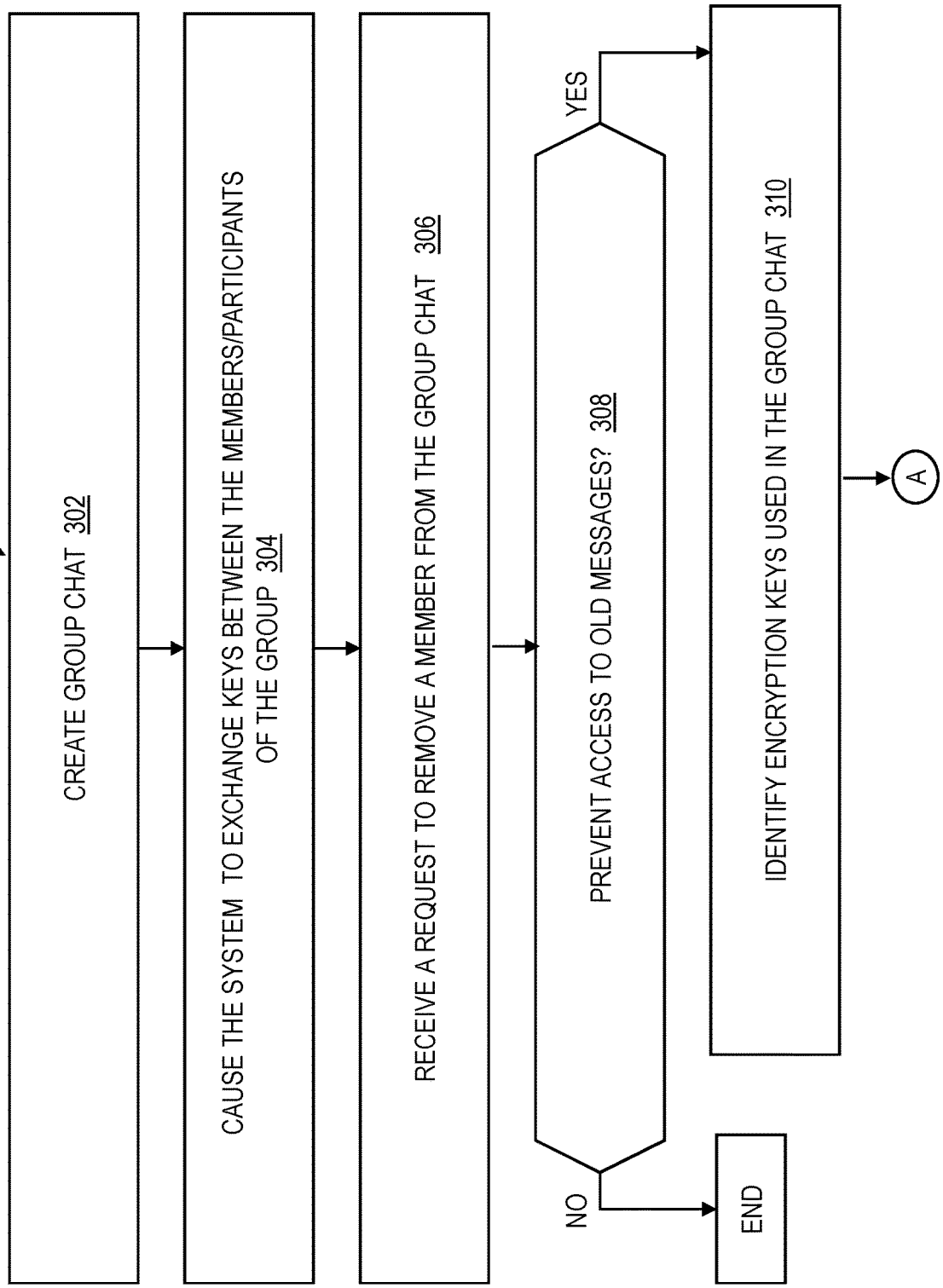

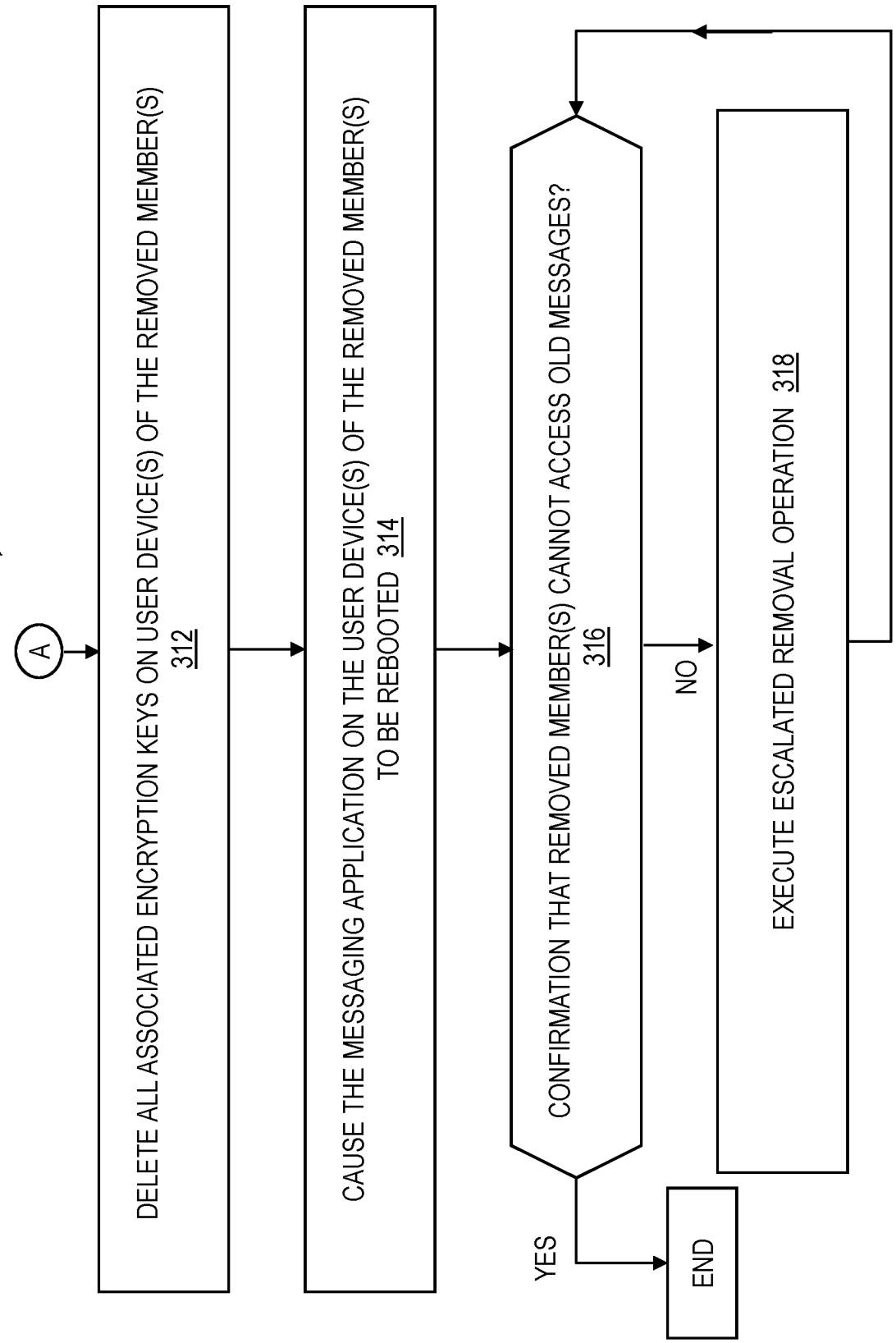

FIG. 7

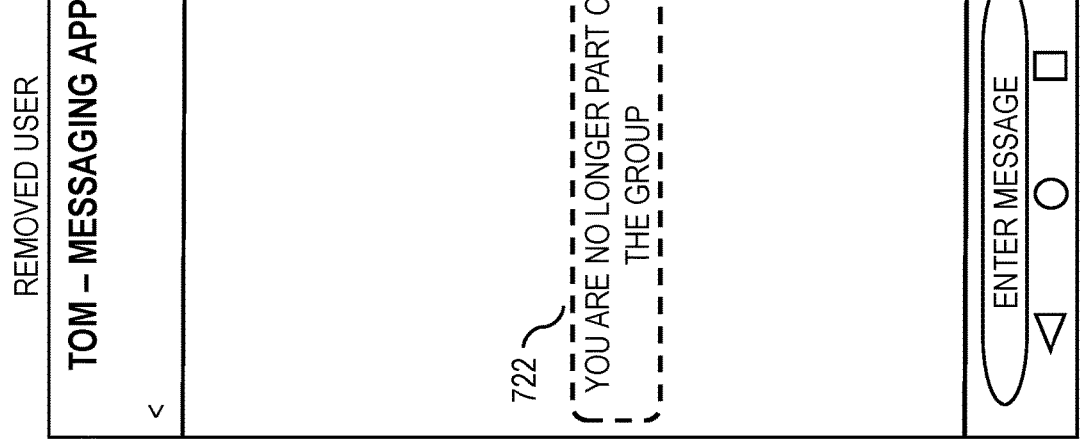
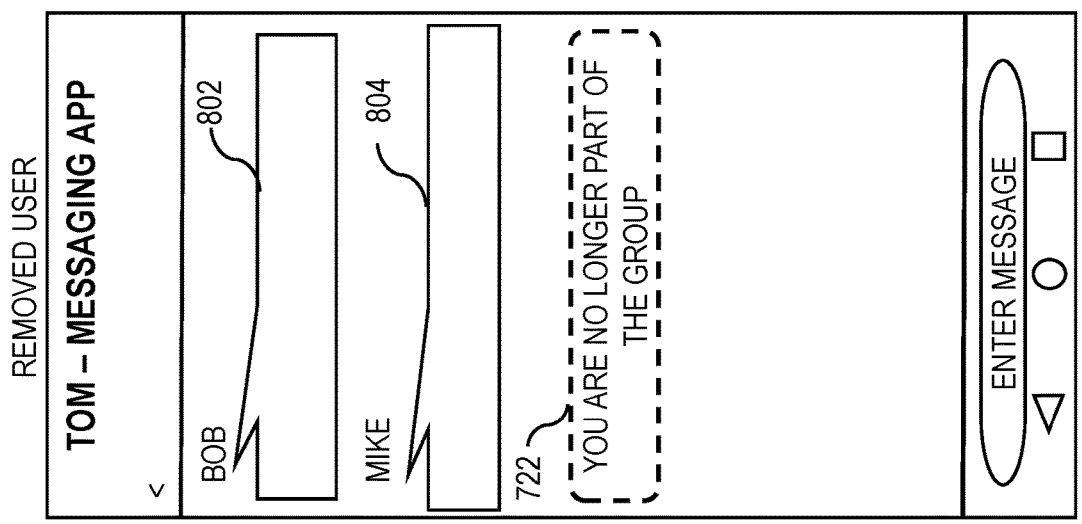

PREVENTING ACCESS OF REMOVED USERS TO MESSAGES SHARED IN A GROUP CHAT

BACKGROUND

The present invention generally relates to computer systems, and more specifically, to computer-implemented methods, computer systems, and computer program products configured and arranged to prevent access of removed users to messages shared in a group chat with an end-to-end encryption.

Data encryption is the process of using an algorithm that transforms standard text characters into an unreadable format. Data encryption uses keys to scramble data so that only authorized users can read it. End-to-end encryption (E2EE) uses this same process, too. End-to-end encryption takes it a step further by securing communications from one endpoint such as a user terminal to another endpoint such as another user terminal. In many messaging services without end-to-end encryption, third parties store the data from the sender, which is encrypted only in transit to the receiver. This server-side encryption method secures the data from unauthorized viewers only but does not provide end-to-end encryption between the sender and receiver. In the case of end-to-end encryption, encrypted data is only viewable by those with decryption keys. In other words, end-to-end encryption prevents unintended users, including third parties, from reading or modifying data when only the intended readers should have this access and ability.

SUMMARY

Embodiments of the present invention are directed to computer-implemented methods for preventing access of removed users to messages shared in a group chat. A non-limiting computer-implemented method includes in response to creation of a group including members for communicating using encryption keys, receiving a request to remove a given member of the members from the group for the communicating, the given member being associated with a computer system, at least one message of the group being accessible to the given member. The method includes identifying the encryption keys associated with the given member and causing a deletion on the computer system of the encryption keys associated with the given member in response to the request. Also, the method includes confirming the deletion of the encryption keys on the computer system associated with the given member, where the deletion of the encryption keys on the computer system associated with the given member prevents access of the computer system to the at least one message of the group.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 3A and 3B are a flowchart of a computer-implemented method for preventing access of removed members to messages shared in a group chat with end-to-end encryption according to one or more embodiments of the present invention;

FIG. 7 depicts example screens of a graphical user interface of the messaging software application displayed for members of a group chat and removed members of the group chat according to one or more embodiments of the present invention;

FIGS. 8A and 8B depict example screens of a graphical user interface of the messaging software application displayed for removed members of a group chat according to one or more embodiments of the present invention;

DETAILED DESCRIPTION

One or more embodiments are configured and arranged to provide a privacy method to prevent access of removed users to messages shared in a group chat with end-to-end encryption.

Messaging applications, messenger applications, chat applications, instant messaging applications, etc., are formed of software that enables messages to be sent and received. The messages may be text as well as audio and video. Messaging applications can transmit and receive a much wider range of data types than Short Message Service (SMS) or Multimedia Messaging Service (MMS). In addition to voice calls, video calls, and text, users of messaging applications can send and receive files, images, audio, location data, emojis, and in some cases documents.

Messaging applications have something in common in that a user can create groups to talk with people by sending and receiving messages. The group can be referred to as a group chat. A group chat is the type of chat that allows the users to communicate with multiple people in the entire group at the same time. The content shared in the group is visible for all the participants at their respective computer systems using end-to-end encryption. Due to privacy, the server does not and cannot review the data because the data is sent directly to the other user using end-to-end encryption. Most common messaging applications such as, for example, WHATSAPP®, SIGNAL®, FACEBOOK MESSENGER®, VIBER®, SKYPE®, etc., use the Signal Protocol (designed by Open Whisper Systems) for end-to-end encryption. This end-to-end encryption protocol is designed to prevent third parties (including the companies that own the messaging applications) from having plaintext access to messages or calls. Therefore, this means that the processing of the data is performed at the application level. Accordingly, under this current mechanism, the messages in the group chat have an issue regarding data privacy of previous messages in the group chat. The vulnerability may be exposed when a person is removed from a group chat, and the server reissues a set of keys to all the participants except the removed person, so that removed person is not able to read any future messages, even if the person is added (back) later to the group. Although this typical method prevents the removed person from viewing any future message after being removed, this typical method does not prevent the removed person from accessing old messages from the group chat, which is a data privacy flaw especially when the information disclosed in the group chat was private.

Accordingly, one or more embodiments are provided to prevent access of removed users to old messages previously shared on a group chat in addition to future messages, after the user has been removed. One or more embodiments disclose techniques to delete the encryption keys of the removed users to prevent the removed users from accessing old message in the group chat.

Figure 1:
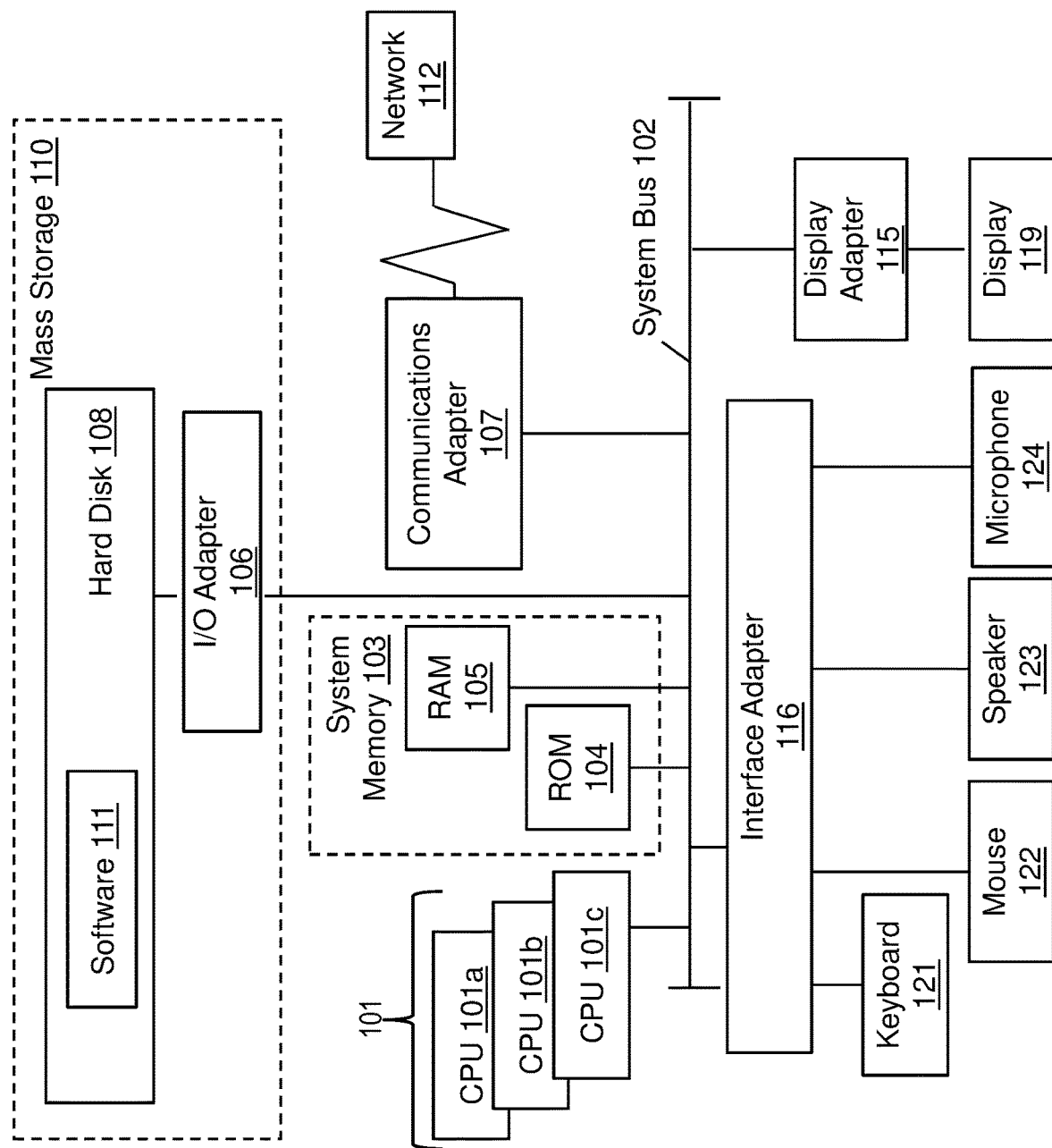
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
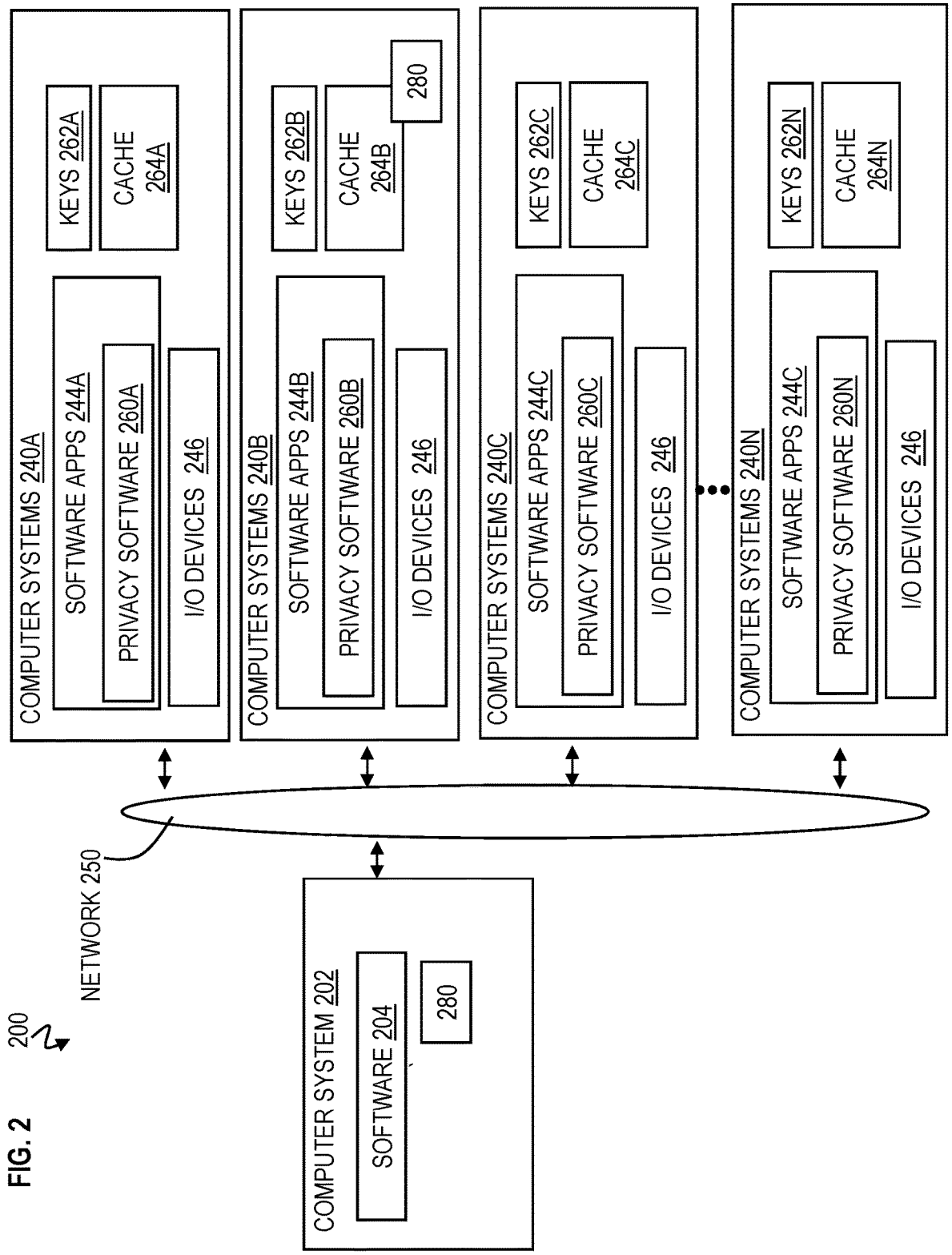
FIG. 2 depicts a block diagram of an example system configured to prevent access of removed members to messages shared in a group chat with end-to-end encryption according to one or more embodiments of the present invention.

FIG. 2 depicts a block diagram of an example system 200 configured to prevent access of removed users to old messages previously shared in a group chat with end-to-end encryption according to one or more embodiments. The system 200 includes a computer system 202 configured to communicate over a network 250 with many different computer systems, such as a computer system 240A, a computer system 240B, a computer system 240N. The computer systems 240A, 240B, through 240N can generally be referred to as computer systems 240 and are utilized for communication between one another, such as for phone calls, video calls, messaging including short message service (SMS) and multimedia messaging service (MMS), etc. The computer systems 240 can be representative of user terminals utilized by respective users in the group chat. The computer systems 240 can be representative of mobile devices including smart devices, desktop computers, laptop computers, tablet computers, etc. A smart device is an electronic device, generally connected to other devices or networks via different wireless protocols that can operate to some extent interactively. Several notable types of smart devices are smartphones, smartwatches, smart bands, smart glasses, and many others. The network 250 can be a wired and/or wireless communication network, and the communication network includes a telecommunications network, the public switched telephone network (PTSN), voice over IP (VOIP) network, etc. The communication network includes cellular networks, satellite networks, etc.

For explanation purposes and not limitation, some example scenarios may identify a sender, administrator, administrator member, administrative user, creator, etc., as a user of computer system 240A and recipients as the users of the computer systems 240B-240N. The administrator has authority to add members to and remove members from the group chat. In many cases, the administrator is the creator of the group chat. It should be appreciated that any of the members can be a sender and recipient in the group chat. For example, any of the computer systems 240 could be a sender of a message while other computer systems 240 are the recipients of the message, and vice versa.

The computer systems 240 can include various software and hardware components including software applications (apps) 244 for communicating with one another over the network 250 as understood by one of ordinary skill in the art. In one or more embodiments, the software applications 244 can include messaging applications with end-to-end encryption for communicating in the group chat as discussed herein. The software applications can be referred to as messaging software applications 244.

The messaging software applications 244 of computer system 240 are configured to communicate instructions and commands back and forth with the software 204 of computer system 202. The instructions/commands may serve as requests that cause the computer system 202 to perform operations that prevent a removed member from accessing old messages in the group chat. Additionally, the computer system 202 can send instructions/commands to the computer system 240 of the removed member to perform operations that prevent the removed member from accessing old messages of the group chat.

As noted herein, messaging applications, messenger applications, chat applications, instant messaging applications, etc., are formed of software that enables messages to be sent and received by the computer systems 240. The messages may be text as well as audio and video. In addition to voice calls, video calls, and text, users of messaging applications can send and receive files, images, audio, location data, emojis, documents, etc., via the computer systems 240. The software applications 244 are messaging applications in which a user can create a group to communicate with other users by sending and receiving messages to the entire group in a group chat. A group chat is the type of chat that allows users to communicate with multiple people at the same time, for example, each using their respective computer systems 240.

The software application 244 uses end-to-end encryption for the group chat. For end-to-end encryption of the group chat, encrypted data sent from the sender computer system 240 is only viewable by those with decryption keys at the receiver computer systems 240. In other words, end-to-end encryption prevents unintended users, including third parties, from reading or modifying data when only the intended readers should have this access and ability. End-to-end encryption begins with cryptography, a method for protecting information by transforming the information into an unreadable format called ciphertext. Only users who possess a secret key (for example, at the receiver computer systems 240) can decipher or decrypt the message into plaintext. With end-to-end encryption, the sender or creator encrypts the data at the sender computer system 240, and only the intended receiver or reader can decrypt the data at the receiver computer system 240. Asymmetric or public-key cryptography encrypts and decrypts the data using two separate cryptographic keys. The public key is used to encrypt a message at the sender computer system 240 and send it to the public key's owner. Then, the message can only be decrypted using a corresponding private key at the receiver computer system 240, also known as a decryption key. For example, the Transport Layer Security (TLS) encryption protocol keeps third parties from intercepting messages in transit.

Further, the software application 244 can utilize a cryptographic key called an ephemeral key that is generated for each execution of a key establishment process that meets requirements of the key type (e.g., unique to each message or session).

The messaging application incorporated in the software applications 244 can utilize any suitable end-to-end encryption method for group chats as known by one of ordinary skill in the art. In one or more embodiments, the software applications 244 can communicate with one another using the Signal Protocol (formerly known as the TextSecure Protocol). The signal protocol is a non-federated cryptographic protocol that provides end-to-end encryption for voice and instant messaging conversations. The signal protocol provides confidentiality, integrity, authentication, participant consistency, destination validation, forward secrecy, post-compromise security (aka future secrecy), causality preservation, message unlinkability, message repudiation, participation repudiation, and asynchronicity. The signal protocol also supports end-to-end encrypted group chats. The group chat protocol may be a combination of a pairwise double ratchet and multicast encryption. In addition to the properties provided by the one-to-one protocol, the group chat protocol provides speaker consistency, out-of-order resilience, dropped message resilience, computational equality, trust equality, subgroup messaging, as well as contractible and expandable membership.

Each of messing software applications 244A-244N can include and/or be coupled to privacy software 260A-260N, respectively. The privacy software 260A-260N can generally be referred to as privacy software 260. In one or more embodiments, the privacy software 260 can be a piece of software added as an update, plug-in, etc., to any known messaging application in order to provide privacy options to the administrator of a group chat when one or more members are removed from the group chat. In one or more embodiments, the privacy software 260 is integrated in the messaging software application 244. When a member is removed from the group chat, the privacy software 260 is configured to prevent the removed members from continuing to access previously accessible messages shared in the group chat. When a member is removed from the group chat, the privacy software 260 can include computer-executable instructions that are executed upon receipt of an instruction/command from the computer system 202. Although removing the member prevents the removed member from accessing and viewing any future messages subsequent to his/her removal, the privacy software 260 prevents access to old messages in the group chat after removal even if the removed member previously viewed the old messages. In accordance with one or more embodiments, the privacy software 260 is configured to provide an escalating level of privacy for the group chat to prevent removed members from gaining access to old messages that were available prior to the removal of the removed members, as discussed herein.

The computer systems 240 can include one or more input/output (I/O) devices 246 including cameras, a microphone, a display, and other peripherals. The computer system 202, computer systems 240, software applications 244, software 204, privacy software 260, I/O devices 246, etc., can include functionality and features of the computer system 100 in FIG. 1 including various hardware components and various software applications such as software 111 which can be executed as instructions on one or more processors 101 in order to perform actions according to one or more embodiments of the invention. The privacy software 260, the software applications 244, and the software 204 can include, be integrated with, and/or call other pieces of software, algorithms, application programming interfaces (APIs), etc., to operate as discussed herein. The privacy software 260 and the software applications 244 may be representative of numerous pieces of software designed to work together in order to provide cybersecurity services and protection for one or more computer systems.

The computer system 202 may be representative of numerous computer systems and/or distributed computer systems configured to provide communication services to users of the computer systems 240. The computer system 202 can be part of a cloud computing environment such as a cloud computing environment 50 depicted in FIG. 10, as discussed further herein.

FIGS. 3A and 3B are a flowchart of a computer-implemented method 300 for preventing access of removed members to old messages previously shared on a group chat with end-to-end encryption in addition to future messages according to one or more embodiments. In an example scenario, the computer system 240A is illustrated as the administrator member of the group chat that removes a member of the group chat. In the example scenario, the computer system 240B can be the user terminal of the removed member from the group chat. For explanation purposes and not limitation, the computer-implemented method 300 can be executed by the computer system 240A as the administrator member in conjunction with causing execution of operations on the computer system 202, which causes execution of operations on the computer systems 240 of removed members such as the computer system 240B of a removed member in this example scenario. The computer system 202 can be representative of one or more host computer systems (e.g., servers) that provide a platform for the communication services of the messaging software applications 244, including, for example, setting up the group chat and providing encryption services for end-to-end encryption of the group chat. The users of computer systems 240A-240N are in the group chat with end-to-end encryption, where each computer system 240 has its own private key and the public keys of other computer systems 240 in the group chat. For example, the computer system 240A has its own private key for decrypting messages that have been encrypted with its public key, where only the public key is provided to the public, which are the other computer systems 240 in the group chat along with the computer system 202. The same applies by analogy for all of the computer systems 240 in the group chat. In one or more embodiments, the public keys and private keys may be ephemeral keys that are updated for each session, updated for a predefined time, etc. In one or more embodiments, the ephemeral keys for each member can be generated periodically from the respective private keys of the members as facilitated by the host computer system 202, resulting in ephemeral public keys that can be utilized to encrypt messages. In one or more embodiments, the ephemeral keys are temporary public keys. As understood by one of ordinary skill in the art, there is a one-to-one relationship between the public key and the private key for a computer system 240, such that each computer system 240 has a public key private key pair. In one or more embodiments, the computer system 240A can communicate with the other computer systems 240B-240N via the computer system 202, although the computer system 202 cannot decrypt messages because each computer system 240 maintains its own private key. Reference can be made to any figures discussed herein.

Referring to FIG. 3A, at blocks 302 and 304 of the computer-implemented method 300, the messaging software application 244A of computer system 240A is configured to create a group chat with members using computer systems 240A-240N and cause encryption keys to be exchanged between the computer systems 240A-240N of the members. The computer systems 240A-240N can have various encryption keys 262A-262N for end-to-end encryption as understood by one of ordinary skill in the art, and encryption keys 262A-262N can generally be referred to as encryption keys 262. For example, the group chat may have one-hundred or more members, each with their own public and private key pair. In one or more embodiments, each member can be associated with some keys, such as ephemeral keys, which are utilized for a given time period, a given chat session, etc., in accordance with the encryption protocol being utilized. In general, the host computer system 202 can facilitate the exchange of encryption keys for end-to-end encryption, and the group chat can be created using any technique known by one of ordinary skill in the art.

Figure 4:
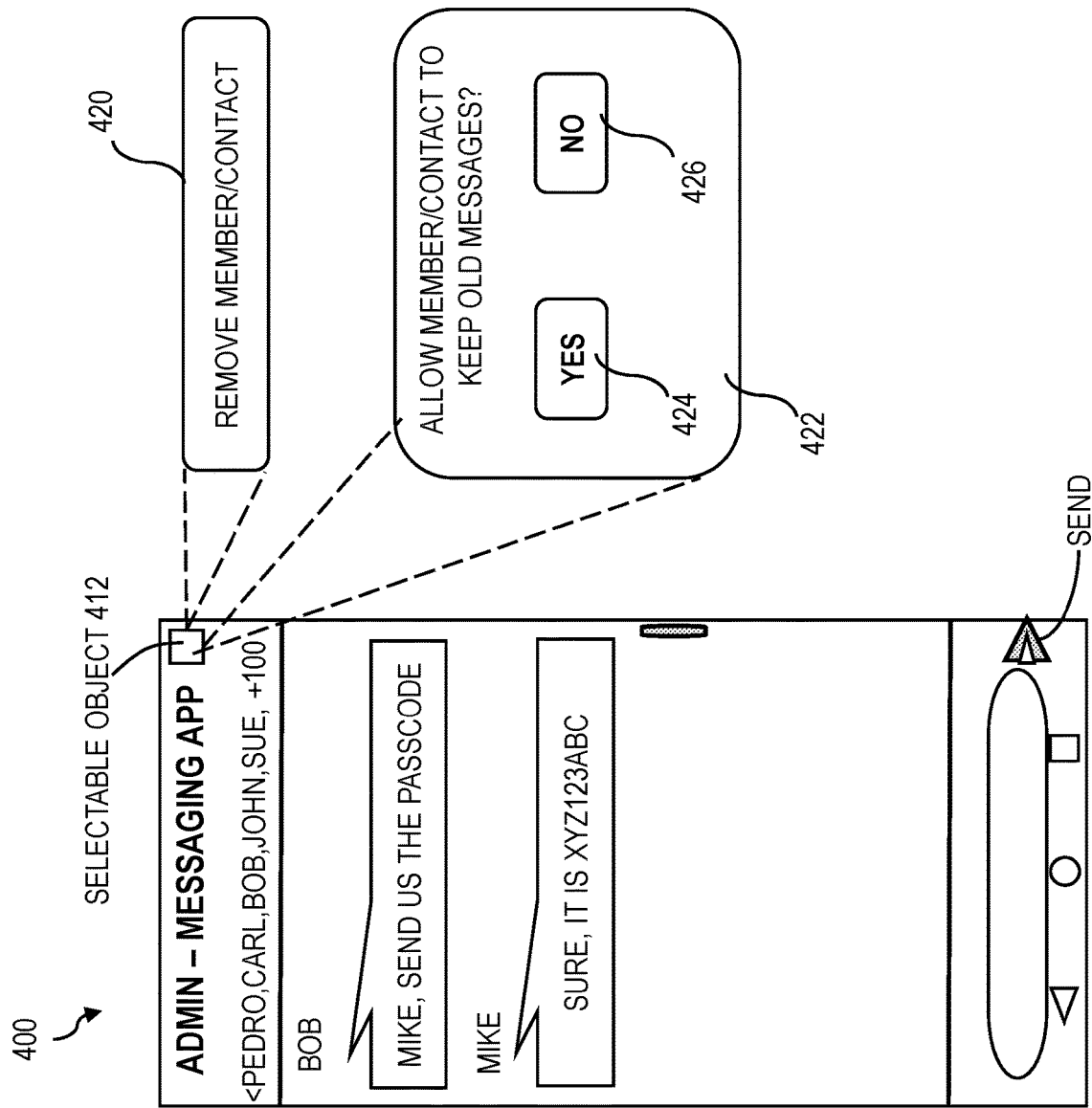
FIG. 4 depicts an example screen of a graphical user interface displayed for an administrative member of the group chat to remove members from a group chat and prevent access of the removed members to messages shared in the group chat according to one or more embodiments of the present invention.

FIG. 4 depicts an example screen 400 of a graphical user interface (GUI) of the messaging software application 244 displayed for the administrator member of the group chat according to one or more embodiments. Messages are sent and received by the members of the group chat using end-to-end encryption, prior to removing a member from group chat.

Figure 5:
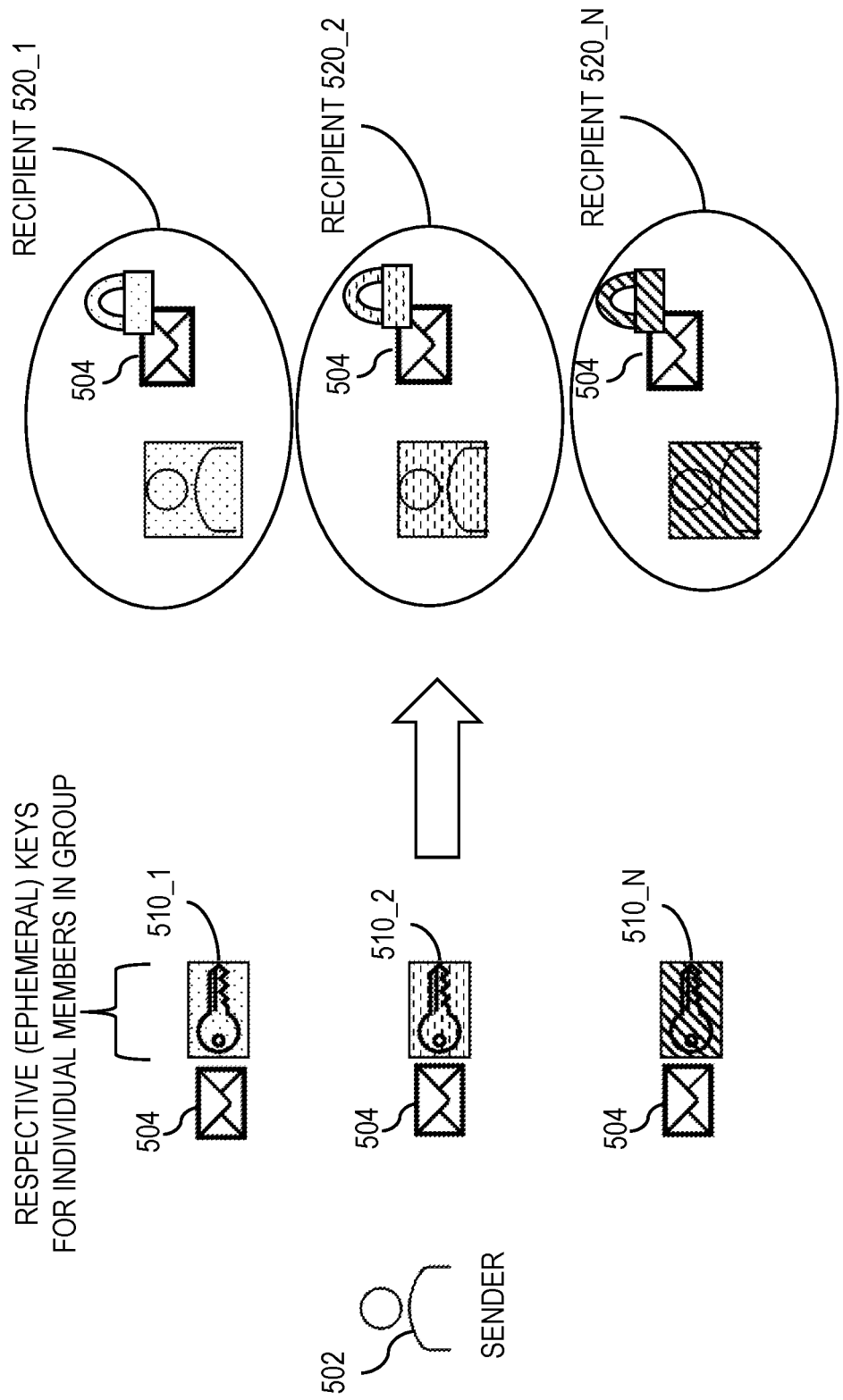
FIG. 5 depicts an example of group chat communication using end-to-end encryption according to one or more embodiments of the present invention.

FIG. 5 depicts an example for sending a group chat message using end-to-end encryption. In FIG. 5, a sender 502 using, for example, the computer system 240A, sends a group chat message 504 to all members in the group chat. As seen in FIG. 5, upon sending the group chat message 504, the messaging software application 244A is configured to use a fan-out approach every time a user sends a message to the group, such that the messaging software applications 244A encrypts each new group chat message 504 separately using the individual (ephemeral) public key for each user. A separately and distinctively encrypted new group chat message 504 is sent to each recipient 520_1, 520_2, and 520_N, where the recipients are members using their respective computer systems 240. Upon receipt of the new group chat message 504, each of the members can use its own (secret) private key to decrypt the new group chat message 504. For example, a public key 510_1 is used to encrypt the group chat message 504 for a recipient 520_1 that uses its corresponding private key to decrypt the group chat message 504 on the computer system 240. Likewise, a public key 510_2 is used to encrypt the group chat message 504 for a recipient 520_2 that uses its corresponding private key to decrypt the group chat message 504 on the computer system 240. Similarly, a public key 510_N is used to encrypt the group chat message 504 for a recipient 520_N that uses its corresponding private key to decrypt the group chat message 504 on the computer system 240. Although the encrypted group chat messages 504 may pass through one or more host computer systems 202, the computer system 202 cannot read the encrypted group chat messages 504, because each of the computer systems 240 has its own private key to respectively decrypt the encrypted group chat message 504. Each time a messaging software application 244 receives a new group chat message, the messaging software application 244 applies its own (unique) private key to the received new group chat message in order to decrypt the received new group chat message.

Figure 6:
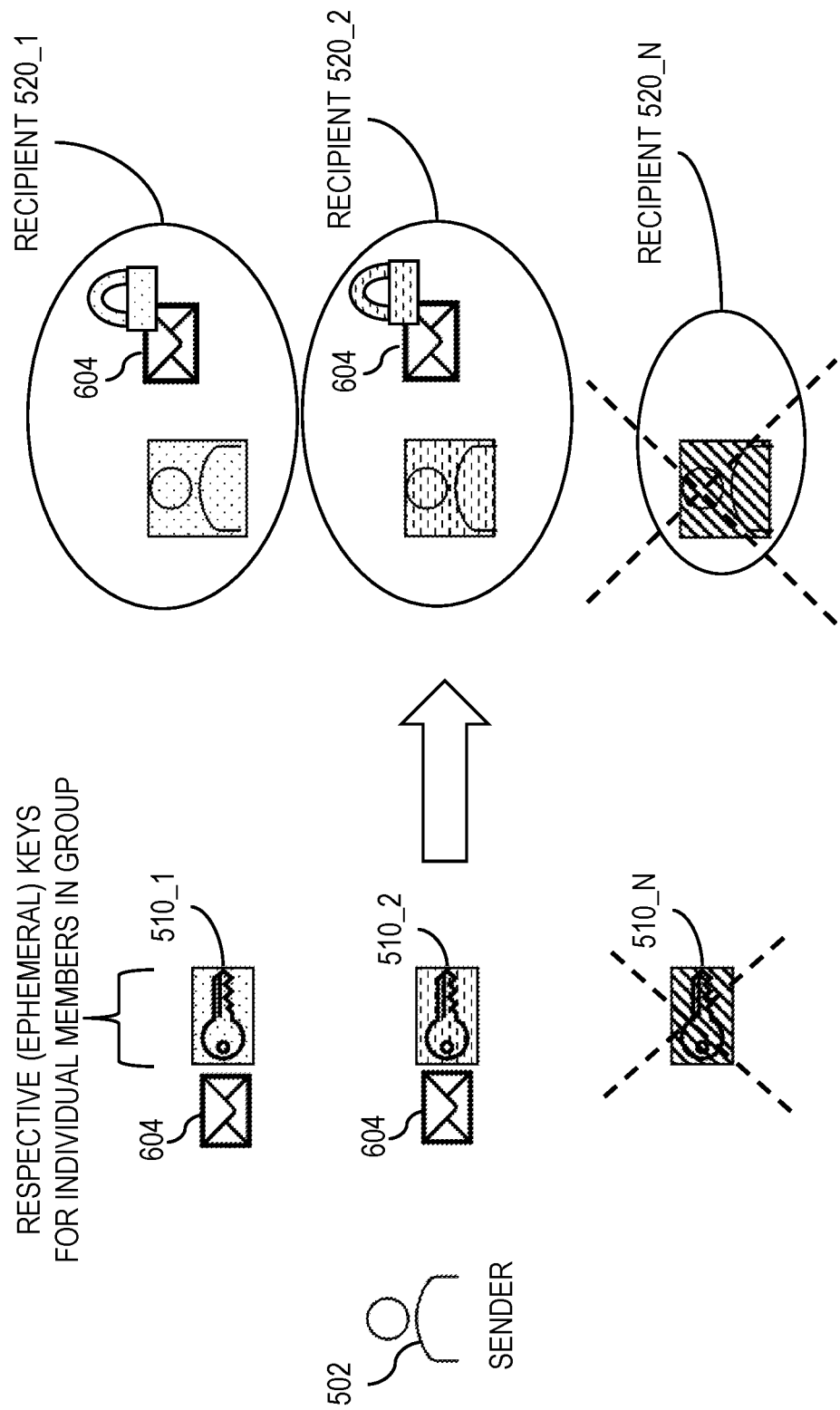
FIG. 6 depicts an example of group chat communication after removal of a member from the group chat according to one or more embodiments of the present invention.

FIG. 6 depicts an example of sending a new group chat message 604 using end-to-end encryption after selected members have been removed from the group chat. In FIG. 6, a sender 502 using, for example, the computer system 240A, generates and sends the new group chat message 604 to the group. As seen in FIG. 6, once the new group chat message 604 is generated, the messaging software application 244A is configured to use a fan-out approach every time a user sends a message to the group, such that the messaging software applications 244A encrypts each new group chat message 604 separately using the individual (ephemeral) public key for each user. As discussed herein, the messaging software application 244A on computer system 240A (as the sender) uses the public key 510_1 corresponding to the computer system 240B to encrypt the group chat message 604 for the recipient 520_1 such that the messaging software application 244B on computer system 240B can use its corresponding private key to decrypt the group chat message 604. Likewise, the messaging software application 244A on computer system 240A (as the sender) uses the public key 510_2 corresponding to the computer system 240C to encrypt the group chat message 604 for the recipient 520_2 such that the messaging software application 244C on computer system 240C can use its corresponding private key to decrypt the group chat message 604. However, unlike FIG. 5, for the removed members, the messaging software application 244A on computer system 240A (as the sender) does not send the new group chat message 604 to the computer systems 240 of the removed members as illustrated in FIG. 6.

Referring to FIG. 3A, at block 306, the messaging software application 244A is configured to receive a request to remove a member from the group chat. In the example scenario, the administrator member on computer system 240A removes the member on computer system 240B from the group chat. By removing the member on computer system 240B, the removed member is no longer able to receive any new group chat messages in the group chat after removal. For example, the administrator member can use the messaging software application 244A to select a selectable object 412 (e.g., a button, input field, etc.) that provides the option to remove one or more members from the group chat, as depicted in FIG. 4. In one implementation, the administrator member may hover over the selectable object 412 with a cursor. A selectable object 420 can appear, pop-up, drop down, etc., for the administrator member to use. In one or more embodiments, the selectable object 412 may display an input field for the sender to enter the members/contacts that are to be removed from the group chat and/or may display a listing of the members/contacts from which a selection causes the selected members/contacts of the listing to be removed from the group chat. In response to identifying/selecting the member to remove, the messaging software application 244 is configured to display a selectable object 422 that inquires whether the removed member/contact is allowed to keep old messages in FIG. 4. In one or more embodiments, the privacy software 260 can be initiated or called to provide further privacy options regarding keeping the old messages and/or the privacy software may be integrated in the messaging software application 244. In one or more embodiments, the messaging software application 244 can receive user input of a selectable object 424 to allow the removed member to keep access to old messages and can receive user input of a selectable object 426 to cause the old messages to be inaccessible to the removed member. The privacy of the group chat is improved by making the old messages inaccessible and unviewable to removed members. Although FIG. 4 illustrates that the software messaging application 244 is configured to provide the selectable object 422 in response to removing a member from the group chat, the selectable object 422 can be displayed and accessed anytime, for example, via the selectable object 412 without first requiring that a member be removed. For example, the selectable object 422 can be displayed at the creation of the group chat. In one or more embodiments, the selectable object 422 can be set by default to, for example, prevent removed members from having access to view old messages. Although buttons as depicted as selectable objects 424 and 426, the selectable objects can be presented in any manner that provides the administrator member with the functionality including a slidable object, an on/off option, etc.

Referring to FIG. 3A, at block 308, the messaging software application 244A is configured to check whether user input was received to prevent the removed member(s) from having access to old messages that existed prior to removing the member. In one or more embodiments, the messaging software application 244A can send instructions as a request to remove the member to the computer system 202, and the computer system 202 check the request about whether user input was received to prevent the removed member(s) from having access to old messages. When the removed member is still granted access to the old messages, the flow ends.

Referring to FIGS. 3A and 3B, at blocks 310, 312, and 314, when user input is received to prevent access to old messages prior to removing the member, the messaging software application 244A is configured to identify the encryption keys used in the group chat, cause the deletion of all associated encryption keys (e.g., encryption keys 262) on the computer systems 240 (e.g., user devices) of the removed members, and cause the messaging software application 244 (e.g., messaging software application 244B) of the removed member to be rebooted or restarted. The administrator member can choose to enhance the privacy and restrict access to previous chat message published in the group. For example, the administrator member can select the selectable object 426 of the messaging software application 244 in FIG. 4 to cause old messages to be removed from the computer system 240 of the removed member by deleting all user encryption keys.

Deleting the encryption keys (e.g., encryption keys 262) includes deleting all keys generated by the encryption protocol, where the encryption protocol can initially be instantiated at the host computer system 202. For example, in the case of the signal protocol as the encryption protocol, the messaging software application 244A of the computer system 240A for the administrator member causes the host computer system 202 to delete the chain key, signature key, and all sender keys (e.g., public keys) on the computer systems 240 of the removed members. While some keys are one-time keys, there are other keys that are ephemeral, and therefore, the host computer system 202 is configured to cause the deletion of the various ephemeral keys on the computer systems 240 of the removed members. The encryption keys (e.g., encryption keys 262) including the ephemeral keys are stored on the computer systems 240 (i.e., the end-user devices) of the removed member, and therefore, the host computer system 202 is configured to send a request to the messaging software applications 244 on computer systems 240 to delete those keys (e.g., encryption keys 262). The request from the host computer system 202 also causes the messaging software applications 244 of the computer systems 240 to reboot to ensure that the keys (e.g., encryption keys 262) were completely removed and cleaned from memory. In the example scenario, by the selection of the selectable object 426 of messaging software application 244A, the messaging software application 244A instructs the software application 204 of the host computer system 202 to instruct/cause the messaging software application 244B of computer system 240B of the removed member to delete the encryption keys 262B and then reboot the messaging software application 244B. Upon user input of the selectable object 426, the messaging software application 244A is configured to transmit instructions as a trigger for the software application 204 of the host computer system 202 to execute blocks 310, 312, 314, 316, and 318 discussed herein. Further, the messaging software application 204 can transmit instructions to the host computer system 202 to cause the execution of blocks 302, 304, 306, and 308, in accordance with user input.

Referring to FIG. 3B, at block 316, the messaging software application 244A is configured to cause the host computer system 202 obtain confirmation that the removed member(s) cannot access and view the old messages. When (Yes) the host computer system 202 confirms that the messaging software application 244 of the removed member cannot access the old messages, the flow ends. In one or more embodiments, the computer system 202 may send a confirmation message to the messaging software application 244A.

At block 318, when the host computer system 202 checks and determines that the old messages are still accessible and viewable on the messaging software application 244 of the removed, the messaging software application 244A is configured to cause the software application 204 of the host computer system 202 to execute escalate removal operations.

In one or more embodiments, at the instruction/request/command of the messaging software application 244A, the software 204 of the host computer system 202 is caused to correlate the latest old message received on the computer system 240B of the removed member before the deletion of the encryption keys against the same old message after the encryption keys have been deleted on the computer system 240B of the removed member. For example, the group chat message 280 is the latest old message sent to and received by the removed member of the computer system 240B in the example scenario. The host computer system 202 is configured to retrieve and compare the version of the group chat message 280 on the computer system 240B before deletion of the encryption keys (e.g., encryption keys 262B) to the version of the group chat message 280 after deletion of the encryption keys. If the text is determined to be different between the two versions of the group chat message 280, the software 204 of the host computer system 202 determines that the encryption keys (e.g., encryption keys 262B) were successfully deleted from computer system 240B of the removed member and sends a successful message to the administrator member of computer system 240A that requested this process. If the versions of the group chat message 280 are determined to be the same, the software 204 of the host computer system 202 determines that encryption keys (e.g., encryption keys 262B) were not successfully deleted from the computer system 240B of the removed member. In this case, the host computer system 202 is configured to perform additional methods (e.g., at block 318) to delete the encryption keys including delete the encryption keys using elevated permissions (root access), clear the cache (e.g., cache 264B) of the messaging software application 244B, autonomously un-install and re-install the messaging software application 244B of the removed member, and/or delete backup copies (e.g., in cache 264B) of the group chat on the computer system 240B of the removed member. Each messaging software application 244A-244N may store data including old messages in its respective cache 264A-264N associated with the messaging software application. The caches 264A-264N can generally be referred to as caches 264. In one or more embodiments, the additional methods to delete the encryption keys can be performed in a progressive escalation in which one method is performed and then a check (e.g., at block 316) is performed to confirm whether the deletion occurred, before escalating to the next method to delete the encryption keys.

Further, one or more embodiments can be utilized to prevent removed members from retrieving deleted messages from a backup repository on the host computer system 202. In this scenario, once a message is deleted from the computer system 240 of the removed member, the host computer system 202 also removes the related ephemeral keys to ensure that removed member cannot access those deleted messages from the backup repository.

Now turning to FIG. 7, depicted are example screens of a graphical user interface of the messaging software application 244 that can be displayed according to one or more embodiments. In the example scenario depicted in FIG. 7, a member (e.g., Bob) has requested that a passcode be sent to the group chat which occurs at a time prior to the removal of a member (e.g., Tom) from the group. As discussed herein, the sender (e.g., Mike) can use the messaging software application 244 to generate the new group chat message with the requested user passcode (e.g., XYZ123ABC). In FIG. 7, a screen 710 depicts the graphical user interface displayed to normal users who are the members of the group chat and have not been removed. Referring back to the example scenario, the administrator member has removed a member (e.g., Tom) from the group. In screen 710, the normal users who have not been removed receive a message 712 indicating that the removed member (e.g., Tom) has been removed from the group chat.

Referring to FIG. 7, when the removed member (e.g., Tom) is permitted to continue accessing the old messages in the group chat in accordance with selectable object 424, the graphical user interface of the messaging software application 244 can display a screen 720 in which old messages prior to removal are still accessible, while new messages are inaccessible after removal. When the removed member (e.g., Tom) is not permitted to continue accessing the old messages in the group chat in accordance with selectable object 426, the graphical user interface of the messaging software application 244 can display a screen 730 in which old messages prior to removal are obfuscated/illegible (e.g., obfuscated old messages 732 and 734), while new messages are inaccessible after removal. In screens 720 and 730, the removed member can be displayed a message 722 indicating that you have been removed from the group.

FIGS. 8A and 8B depict example screens of a graphical user interface of the messaging software application 244 that can be displayed according to one or more embodiments. When the removed member (e.g., Tom) is not permitted to continue accessing the old messages in the group chat in accordance with selectable object 426, a screen 810 of the graphical user interface displays blank old messages 802 and 804 where the content is blank, while new messages are inaccessible after removal. The blank old messages 802 and 804 indicate an existence of a message, but no content is provided at the displayed location of the blank old messages 802 and 804 in the screen 810. In some embodiments, the blank old messages 802 and 804 do not display the senders. In some embodiments, the identification of the senders (e.g., Bob and Mike) may be displayed along with the blank old messages 802 and 804. Similarly, the option of displaying or not displaying the sender is available for the obfuscated messages 732 and 734 in the screen 730.

When the removed member (e.g., Tom) is not permitted to continue accessing the old messages in the group chat in accordance with selectable object 426, a screen 820 of the graphical user interface displays no old messages as a blank space 840 where the content is blank, while new messages are inaccessible after removal. That is, the view of the screen 820 of a graphical user interface of the removed members is displayed as though no old messages were ever sent to the removed members, such that there is no notice or indication of deleted old messages.

Although some examples may discuss a single removed member/contact who is removed from the group, it should be appreciated that there can be numerous members/contacts removed from the group. Accordingly, the example description and scenarios provided herein for one removed member/contact apply by analogy to numerous removed members/contacts.

Figure 9:
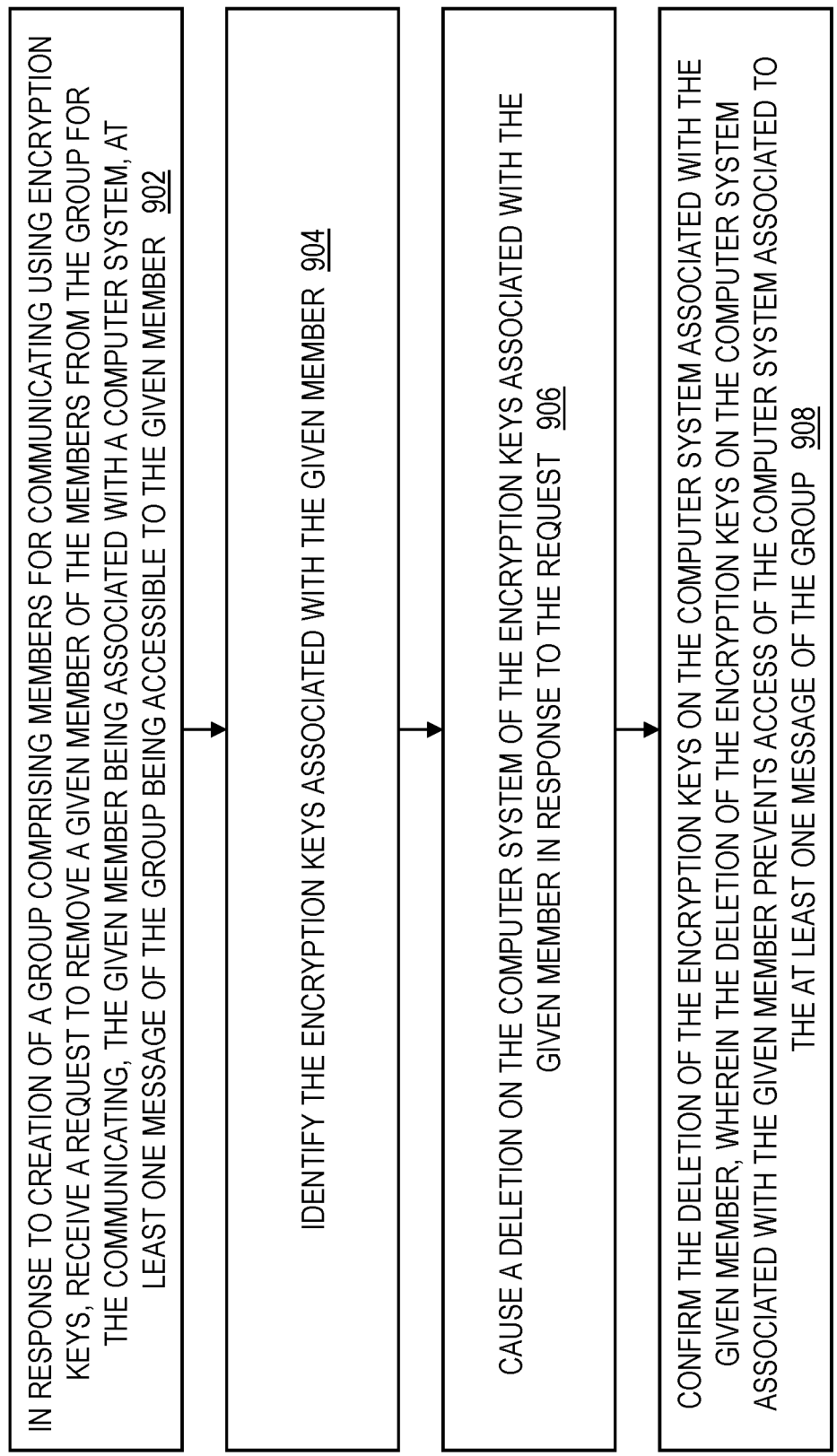
FIG. 9 is a flowchart of a computer-implemented method for preventing access of removed members to messages shared in a group chat with end-to-end encryption according to one or more embodiments of the present invention.

FIG. 9 is a flowchart of a computer-implemented method 900 for removing members in a group chat and preventing access of the removed members to (previous/old) messages previously shared in the group chat with end-to-end encryption according to one or more embodiments. To continue the example scenario and for explanation purposes, the administrator member can be represented as the user of the messaging software application 244A on the computer system 240A, but it should be understood that any of the members of the group chat can be the administrator of their own group chat. In one or more embodiments, the messaging software application 244A of the computer system 240A can work in conjunction with the software 204 of the computer system 202 to perform the computer-implemented method 900. In one or more embodiments, the messaging software application 244A of the computer system 240A can provide/transmit instructions and commands that cause the software 204 of the computer system 202 to perform the computer-implemented method 900. In one or more embodiments, the software 204 of the computer system 202 transmits instructions and commands to cause the computer system 240 of the removed member(s) to perform operations as discussed herein. Reference can be made to any figures discussed herein.

At block 902, the computer-implemented method 900 includes, in response to creation of a group including members for communicating using encryption keys (e.g., encryption keys 262), receiving a request to remove a given member of the members from the group for the communicating, the given member being associated with a computer system 240, at least one message (e.g., old messages) of the group being accessible to the given member. For example, the messaging software application 244A of computer system 240A can receive user input to remove a member/contact (e.g., the member using computer system 240B) from the group chat, as depicted in FIG. 4. The software 204 of the computer system 202 can receive the request to remove the member from the group chat from the computer system 240A, in response to the user selecting the selectable object 420.

At block 904, the computer-implemented method 900 includes identifying the encryption keys (e.g., encryption keys 262B) associated with the given member. The messaging software application 244A of computer system 240A can identify and/or cause the software 204 of computer system 202 to identify the encryption keys 262B associated with the removed member using computer system 240B (although the private key may not be identified, the private keys is known to be related to the public key).

At block 906, the computer-implemented method 900 includes causing a deletion on the computer system 240 of the encryption keys 262 associated with the given member in response to the request. By sending the request, the messaging software application 244A of computer system 240A can instruct/command the software 204 of computer system 202 to cause the encryption keys 262B (e.g., the public key and private key along with any other keys including ephemeral keys) to be deleted from the computer system 240B of the removed member by instructing the messaging software application 244B of the computer system 240B to execute the deletion.

At block 908, the computer-implemented method 900 includes confirming the deletion of the encryption keys 262 on the computer system 240 associated with the given member, where the deletion of the encryption keys on the computer system 240 associated with the given member prevents access of the computer system 240 to the at least one message of the group. By the computer system 240A sending to the computer system 202 the request to remove the member from the group, the messaging software application 244A causes/instructs the software 204 to confirm the deletion of the encryption key 262B by performing operations discussed herein.

In one or more embodiments, causing the deletion of the encryption keys further includes causing a restart of a software application on the computer system (e.g., restarting the messaging software application 244B on computer system 240B), the software application being utilized for the communicating with the group using the encryption keys. The computer system 202 can instruct the messaging software application 244B on computer system 240B of the removed member to restart. The messaging software application 244A can send the request (e.g., with instructions), as a trigger, to instruct the computer system 202 to cause the messaging software application 244B on computer system 240B of the removed member.

Confirming the deletion of the encryption keys (e.g., encryption keys 262B) on the computer system associated with the given member includes: comparing a first version of the at least one message (e.g., a first version of the old message 280) prior to the request to a second version of the least one message (e.g., a second version of the old message 280) subsequent to the request; and in response to determining that the first version and the second version are different, confirming that the deletion of the encryption keys on the computer system prevents access of the computer system to the at least one message of the group. By the computer system 240A sending to the computer system 202 the request to remove the member from the group, the messaging software application 244A causes/instructs the software 204 of the computer system 202 to confirm the deletion of the encryption keys 262B on the computer system 240B.

The computer-implemented method 900 includes, in response to comparing a first version of the at least one message prior to the request to a second version of the least one message (e.g., comparing the first version to the second version of the old message 280) subsequent to the request, determining that the first version and the second version are a same; and causing further actions to be performed to prevent access of the computer system to the at least one message (e.g., the old message 280) of the group. By the computer system 240A sending to the computer system 202 the request to remove the member from the group, the messaging software application 244A causes/instructs the software 204 of the computer system 202 to compare the first and second versions of the old message 280 as discussed herein.

The further actions are selected from the group including causing (e.g., on computer system 240B) another deletion of the encryption keys (e.g., encryption keys 262B) by root access, causing a clearing of a cache of a software application (e.g., the cache 264B for messaging software application 244B), causing an automatic uninstallation and reinstallation of the software application (e.g., messaging software application 244B on computer system 240B), and causing a deletion of backup copies of the group chat (e.g., messages); and the software application (e.g., messaging software application 244B) is utilized for the communicating with the group using the encryption keys.

Causing the deletion on the computer system of the encryption keys associated with the given member in response to the request includes removing ephemeral keys (e.g., of the encryption keys 262B) to ensure that the given member cannot access deleted messages from a backup repository (e.g., a backup repository on computer system 202).

Preventing access of the computer system associated with the given member to the at least one message of the group causes a presentation change on the computer system (e.g., computer system 240B), and the presentation change is selected from the group consisting of an obfuscation of the at least one message and a visualization removal of the at least one message, as depicted in FIGS. 7 and 8.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
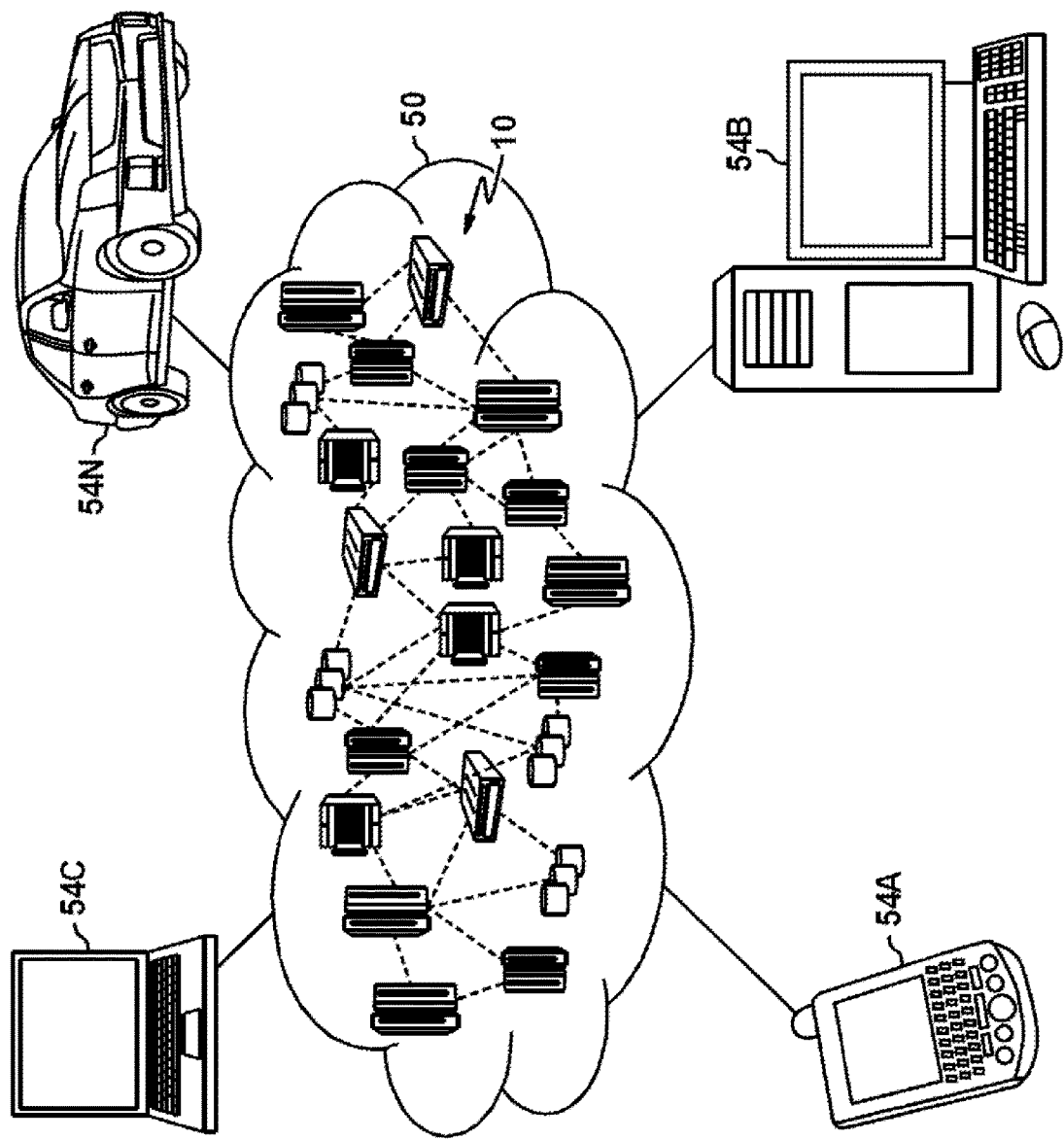
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
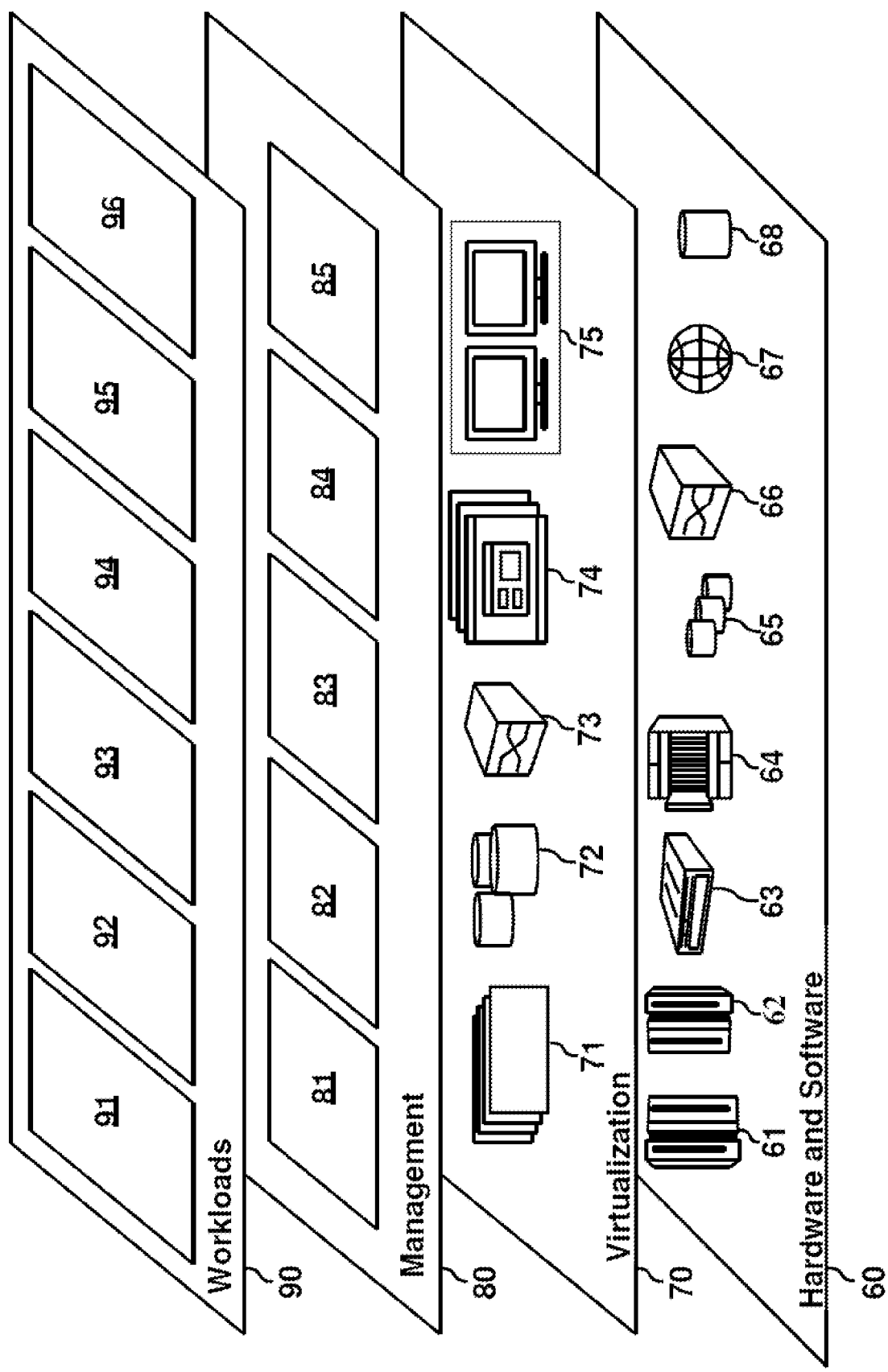
FIG. 11 depicts abstraction model layers according to one or more embodiments of the present invention.

Referring now to FIG. 11, a set of functional abstraction layers provided by cloud computing environment 50 (depicted in FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    in response to creation of a group comprising members for communicating using encryption keys, receiving a request to remove a given member of the members from the group for the communicating, the given member being associated with a computer system, at least one message of the group being accessible to the given member;
    identifying the encryption keys associated with the given member;
    causing a deletion on the computer system of the encryption keys associated with the given member in response to the request; and
    confirming the deletion of the encryption keys on the computer system associated with the given member, wherein the deletion of the encryption keys on the computer system associated with the given member prevents access of the computer system to the at least one message of the group;
    wherein confirming the deletion of the encryption keys on the computer system associated with the given member comprises:
        comparing a first version of the at least one message prior to the request to a second version of the at least one message subsequent to the request; and
        in response to determining that the first version and the second version are different, confirming that the deletion of the encryption keys on the computer system prevents the access of the computer system to the at least one message of the group.

2. The computer-implemented method of claim 1, wherein causing the deletion of the encryption keys further comprises causing a restart of a software application on the computer system, the software application being utilized for the communicating with the group using the encryption keys.

3. The computer-implemented method of claim 1, further comprising:
in response to comparing the first version of the at least one message prior to the request to the second version of the at least one message subsequent to the request, determining that the first version and the second version are a same; and
causing further actions to be performed to prevent the access of the computer system to the at least one message of the group.

4. The computer-implemented method of claim 3, wherein:
the further actions are selected from the group consisting of causing another deletion of the encryption keys by root access, causing a clearing of a cache of a software application, causing an automatic uninstallation and reinstallation of the software application, and causing a deletion of backup copies of messages; and
the software application is utilized for the communicating with the group using the encryption keys.

5. The computer-implemented method of claim 1, wherein causing the deletion on the computer system of the encryption keys associated with the given member in response to the request comprises removing ephemeral keys to ensure that the given member cannot access deleted messages from a backup repository.

6. The computer-implemented method of claim 1, wherein:
preventing the access of the computer system associated with the given member to the at least one message of the group causes a presentation change on the computer system; and
the presentation change is selected from the group consisting of an obfuscation of the at least one message and a visualization removal of the at least one message.

7. A system comprising:
a memory having computer readable instructions; and
one or more processors for executing the computer readable instructions, the computer readable instructions when executed cause the one or more processors to perform operations comprising:
in response to creation of a group comprising members for communicating using encryption keys, receiving a request to remove a given member of the members from the group for the communicating, the given member being associated with a computer system, at least one message of the group being accessible to the given member;
identifying the encryption keys associated with the given member;
causing a deletion on the computer system of the encryption keys associated with the given member in response to the request; and
confirming the deletion of the encryption keys on the computer system associated with the given member, wherein the deletion of the encryption keys on the computer system associated with the given member prevents access of the computer system to the at least one message of the group;
wherein confirming the deletion of the encryption keys on the computer system associated with the given member comprises:

comparing a first version of the at least one message prior to the request to a second version of the at least one message subsequent to the request; and
in response to determining that the first version and the second version are different, confirming that the deletion of the encryption keys on the computer system prevents the access of the computer system to the at least one message of the group.

8. The system of claim 7, wherein causing the deletion of the encryption keys further comprises causing a restart of a software application on the computer system, the software application being utilized for the communicating with the group using the encryption keys.

9. The system of claim 7, wherein the one or more processors are configured to perform operations further comprising:
in response to comparing the first version of the at least one message prior to the request to the second version of the at least one message subsequent to the request, determining that the first version and the second version are a same; and
causing further actions to be performed to prevent the access of the computer system to the at least one message of the group.

10. The system of claim 9, wherein:
the further actions are selected from the group consisting of causing another deletion of the encryption keys by root access, causing a clearing of a cache of a software application, causing an automatic uninstallation and reinstallation of the software application, and causing a deletion of backup copies of messages; and
the software application is utilized for the communicating with the group using the encryption keys.

11. The system of claim 7, wherein causing the deletion on the computer system of the encryption keys associated with the given member in response to the request comprises removing ephemeral keys to ensure that the given member cannot access deleted messages from a backup repository.

12. The system of claim 7, wherein:
preventing the access of the computer system associated with the given member to the at least one message of the group causes a presentation change on the computer system; and
the presentation change is selected from the group consisting of an obfuscation of the at least one message and a visualization removal of the at least one message.

13. A computer program product comprising a non-transitory computer readable storage medium having program instructions embodied therewith, the program instructions executable by one or more processors to cause the one or more processors to perform operations comprising:
in response to creation of a group comprising members for communicating using encryption keys, receiving a request to remove a given member of the members from the group for the communicating, the given member being associated with a computer system, at least one message of the group being accessible to the given member;
identifying the encryption keys associated with the given member;
causing a deletion on the computer system of the encryption keys associated with the given member in response to the request; and
confirming the deletion of the encryption keys on the computer system associated with the given member, wherein the deletion of the encryption keys on the computer system associated with the given member prevents access of the computer system to the at least one message of the group;

wherein confirming the deletion of the encryption keys on the computer system associated with the given member comprises:

comparing a first version of the at least one message prior to the request to a second version of the at least one message subsequent to the request; and in response to determining that the first version and the second version are different, confirming that the deletion of the encryption keys on the computer system prevents the access of the computer system to the at least one message of the group.

14. The computer program product of claim 13, wherein causing the deletion of the encryption keys further comprises causing a restart of a software application on the computer system, the software application being utilized for the communicating with the group using the encryption keys.

15. The computer program product of claim 13, wherein the one or more processors are configured to perform operations further comprising:

In response to comparing the first version of the at least one message prior to the request to the second version of the at least one message subsequent to the request, determining that the first version and the second version are a same; and causing further actions to be performed to prevent the access of the computer system to the at least one message of the group.

16. The computer program product of claim 15, wherein:

the further actions are selected from the group consisting of causing another deletion of the encryption keys by root access, causing a clearing of a cache of a software application, causing an automatic uninstallation and reinstallation of the software application, and causing a deletion of backup copies of messages; and the software application is utilized for the communicating with the group using the encryption keys.

17. The computer program product of claim 13, wherein causing the deletion on the computer system of the encryption keys associated with the given member in response to the request comprises removing ephemeral keys to ensure that the given member cannot access deleted messages from a backup repository.

* * * * *